MAGNETIC DELAY LINE

Filed May 18, 1953 2 Sheets-Sheet 1

INVENTOR
ROBERT A. RAMEY JR.

BY D. C. Snyder
Howard W. Pitts
ATTORNEYS

MAGNETIC DELAY LINE

Filed May 18, 1953 2 Sheets-Sheet 2

INVENTOR
ROBERT A. RAMEY JR.

BY D. C. Snyder
Emory and White
ATTORNEYS

United States Patent Office 2,770,737

Patented Nov. 13, 1956

2,770,737

MAGNETIC DELAY LINE

Robert A. Ramey, Jr., Pittsburgh, Pa.

Application May 18, 1953, Serial No. 355,892

15 Claims. (Cl. 307—88)

(Granted under Title 35, U. S. Code (1952), sec. 266)

This invention relates to magnetic amplifier circuitry and more particularly to a plurality of magnetic amplifier circuits interconnected to form a magnetic delay line or a magnetic timing circuit useful in computer applications.

In my copending application Serial No. 237,813, filed July 20, 1951, for Magnetic Amplifier Control Circuit, there is disclosed a magnetic amplifier of basic design which is predicated on the theory that the magnetic circuit is a voltage sensitive device. This theory follows from the principle that the level of magnetization of a core of saturable magnetic material having a high remanence characteristic may be determined uniquely from the equation $$e\,(\text{volts}) = -N\frac{d\phi}{dt}$$

or where the turns $N=1$, $\phi = -\int$ volt-seconds. Restating this principle, the magnetization level of a saturable magnetic core may be determined uniquely by the time-integral of reactive voltage developed across the winding wound around the core.

In applying the above principle to the design of magnetic amplifiers, the magnetic amplifier disclosed in my copending application aforesaid controls the application of an alternating voltage source to a load impedance by controlling the level of magnetization of a high remanence saturable core through variation of the reactive voltage developed across a winding wound thereon. More specifically, the amplifier is operated in repetitive cycles, each cycle comprising two phases. In the first phase, a control voltage applied in the first half-cycle of the supply source to a winding wound on the core sets the magnetization level of the core at a level below the saturation level in accordance with the time-integral of reactive voltage developed across the winding due to the applied control voltage. In the second phase, a half-cycle of the supply source is applied to a load impedance through a magnetizing winding wound on the core, however, the supply voltage initially appears across the magnetizing winding due to the high reactance thereof. Upon saturation of the core, the winding reactance disappears and the supply voltage is transferred to the load impedance. The instant at which core saturation occurs in the second phase operation, and hence, the interval during which power is supplied to the load, is dependent upon the condition of the core with respect to its magnetization level as set in the preceding half-cycle.

The magnitude of a control voltage, normally from a low power source applied in one half-cycle of amplifier operation, thereby serves to control in the following half-cycle the time duration during which the supply voltage, a high power source, may be applied to the associated load. There is thus occasioned a half-cycle delay between the input of a signal to the magnetic amplifier and the amplified output thereof.

By cascading a plurality of magnetic amplifier circuits according to the present invention, advantage is taken of the defined time delay in each of the amplifier circuits to provide a magnetic delay line or a magnetic timing circuit as desired. More particularly, in the circuitry of the present invention a plurality of magnetic amplifier circuits, each having a control impedance to which the input signal is applied and an output impedance from which the half-cycle delayed signal is obtained, are cascaded with the output impedance of each of the respective circuits forming the control impedance for the following circuit. Therefore, a signal applied to the control impedance of the first magnetic amplifier circuit progresses along the chain of circuits with a discrete time delay per stage of one half-cycle at the operating frequency.

It is therefore an object of the present invention to provide a new magnetic delay line.

Another object of the present invention is to provide a magnetic delay line including a plurality of stages having a discrete time delay in each stage of one half-cycle at the operating frequency.

A further object of the present invention is to provide a delay line having no attenuation of the signals traversing the line.

Still another object of the present invention is to provide a magnetic delay line including a plurality of half-cycle delay stages from which timing signals may be respectively obtained at a predetermined number of half-cycles after the occurrence of the initiating signal.

A still further object is to provide a magnetic delay line including a plurality of stages arranged in endless series to form a ring timing circuit.

Still another object is to provide a magnetic delay line of a rugged and simple nature from conventional components which renders the maintenance factor insignificant.

Other objects of the present invention will become apparent from the following detailed description when taken in conjunction with the drawings in which.

Figure 1:
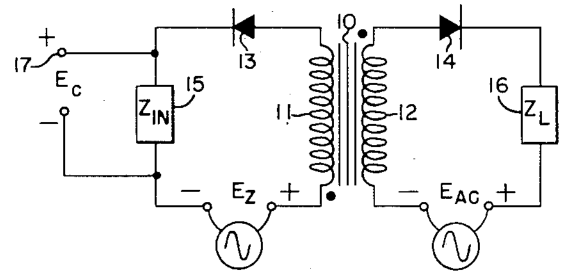
Figure 1 is a schematic diagram of a magnetic amplifier useful for explanatory purposes.

Certain of the basic principles underlying the operation of the present invention may best be explained by reference to the single core magnetic amplifier disclosed in my copending application Serial No. 237,813, referred to above, which will now be described in detail in connection with Figure 1. As shown, this amplifier includes a high remanence saturable magnetic core 10 having wound thereon windings 11 and 12, hereinafter referred to as the demagnetizing or reset winding and the magnetizing or load winding respectively, the dots adjacent thereto referring to winding polarity. An alternating voltage source $E_z$ and an alternating voltage source $E_{ac}$ are respectively provided to supply to windings 11 and 12, a demagnetizing voltage and a magnetizing voltage. The magnitudes of voltages $E_z$ and $E_{ac}$ and the turns on windings 11 and 12 may be subject to considerable design variations, but with the limitation imposed by the circuit that in a complete cycle of operation of the amplifier the time-integral of voltage applied to winding 11 by source $E_z$ in one half-cycle must be substantially equal to the time-integral of voltage applied to winding 12 by source $E_{ac}$ in the next half-cycle.

Generally, sources $E_z$ and $E_{ac}$ will be of the same frequency and phase, therefore, when the turns of windings 11 and 12 are chosen to be equal, the magnitudes of voltage sources $E_z$ and $E_{ac}$ may also be equal. In this case the voltage sources $E_z$ and $E_{ac}$ may conveniently be obtained from a single source appropriately coupled to the windings by conventional transformer connections.

As alluded to above the magnetizing and demagnetizing voltages are to be applied to the respective windings in alternation. For this purpose unilateral impedance devices 13 and 14, which typically may be rectifiers, are connected in series with sources $E_z$ and $E_{ac}$ respectively and are so poled in relation to the polarities of these voltages that in one half-cycle voltage $E_z$ is applied to winding 11 and in the next half-cycle voltage $E_{ac}$ is applied to winding 12. Also connected in series with winding 11 and source $E_z$ is input impedance 15 which may be simply a resistance, but alternatively may take the form to be described in connection with Figure 5. Impedance 15 serves as a means for coupling direct voltage control source $E_c$ at terminals 17 to the demagnetizing or reset circuit, control voltage $E_c$ being variable in magnitude up to the magnitude of demagnetizing voltage $E_z$. Control voltage $E_c$ serves the function of variably reducing the effectiveness of demagnetizing voltage $E_z$ to demagnitize core 10 whereby a variable degree of resetting action may be effected. Hence, the polarity of control voltage $E_c$ is opposite to the polarity of voltage $E_z$ during core demagnetization, as indicated in Figure 1, and therefore opposite to the polarity of rectifier 13 which also serves to prevent the flow of current from the control source to the demagnetizing winding. In the circuit including the magnetizing voltage $E_{ac}$, winding 12 and rectifier 14 in series there is also provided a series load impedance 16 to which the controlled output voltage of the amplifier is to be applied.

Figure 2:
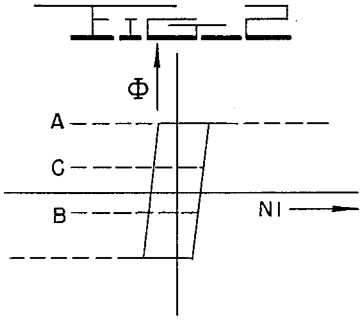
Figure 2 is a graph illustrating a typical hysteresis curve for a high remanence saturable magnetic core as used in the present invention.

In operation of the amplifier as illustrated in Figure 1, assuming core 10 is at the saturation level at the beginning of a reset half-cycle and further that control voltage $E_c$ is zero, full demagnetizing voltage will be applied to winding 11 through rectifier 13 and impedance 15. This results in the magnetization level of core 10 being reset at a predetermined given level below saturation. During the reset half-cycle magnetizing voltage is blocked from winding 12 by rectifier 14. In the following half-cycle, demagnetizing voltage is blocked from winding 11 by rectifier 13 and magnetizing voltage is applied to winding 12 through rectifier 14 and impedance 16. Since the full time-integral of magnetizing and demagnetizing voltages are equal, under the assumed conditions, in the magnetizing half-cycle the magnetization level of the core is raised from the given level below saturation just to the saturation level without the flow of saturation current. During this period magnetizing current will flow and is equal in value to the width of the hysteresis curve of core 10. The magnitude of this current is very small and is assumed to be of negligible effect on output impedance 16. The foregoing operation may more easily be understood with reference to Figure 2 which illustrates a typical hysteresis curve, the abscissa in ampere-turns and ordinates as flux $\Phi$, for a high remanence saturable magnetic material, such as Deltamax, Orthonol, etc., which exhibit substantially rectangular hysteresis loop characteristics with saturation at low values of magnetomotive force. Thus, in the reset or demagnetizing half-cycle, the magnetization level of core 10 is shifted from saturation level A to the given level B below saturation and in the magnetizing half-cycle, the magnetization level of core 10 is elevated from level B to the saturation level.

Now assuming that control voltage $E_c$ is not zero, but some fractional part of demagnetizing voltage $E_z$, then in the reset half-cycle the full time-integral of demagnetizing voltage is not applied to winding 11. The effective resetting voltage now available for demagnetizing core 10 is equal to the difference voltage $(E_z-E_c)$ whereby the magnetization level of core 10 is not shifted to level B but generally to an intermediate level, level C in Figure 2, in accordance with the reduced effectiveness of the demagnetizing voltage. Obviously, should the difference voltage be zero, the magnetization level will not be shifted from the saturation level, but will remain thereat throughout the demagnetizing half-cycle. In the next half-cycle, being the magnetizing half-cycle, with the core initially set at level C, the full time-integral of magnetizing voltage is no longer required to cause saturation of the core. Thus application of magnetizing voltage $E_{ac}$ to winding 12 first causes the saturation of the core whereupon the reactive voltage across winding 12 disappears. For the remainder of the magnetizing half-cycle, voltage $E_{ac}$ is applied directly to output impedance 16 and output or saturation current flows in the circuit including source $E_{ac}$, winding 12, rectifier 14 and load impedance 16. Varying the magnitude of control voltage $E_c$ varies the instant in the magnetizing half-cycle at which core saturation is effected and thus controls the amount of current supplied to the load.

Figure 3:
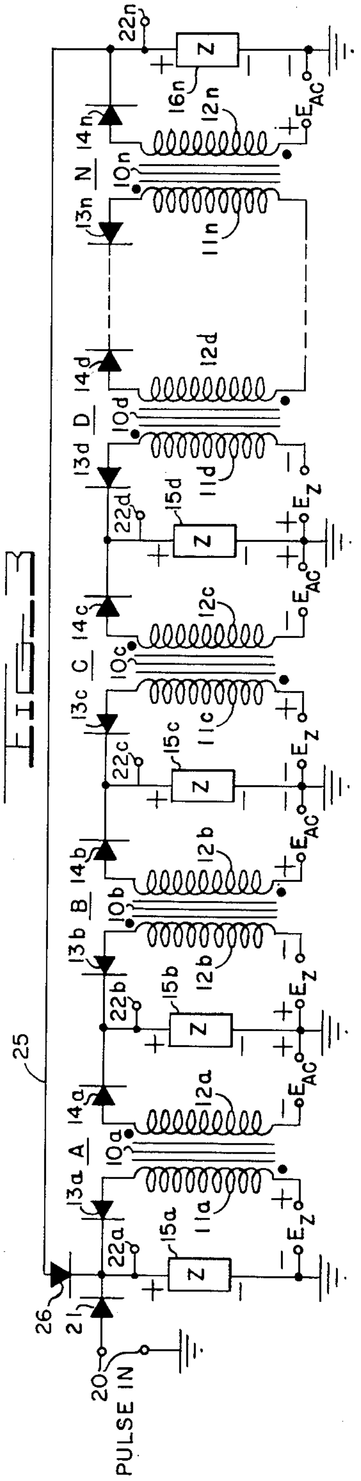
Figure 3 is a schematic diagram of a magnetic circuit embodying the present invention.

Turning now to Figure 3 there is illustrated an embodiment of a magnetic delay line constructed in accordance with the present invention. The delay line may include any desired number of individual time delay stages, generally designated at A, B, C, D–N, each stage being similar to the single core magnetic amplifier as described in connection with Figure 1, like components therein bearing corresponding numerals in Figure 3. Thus each stage in the delay line, for example stage A, includes a high remanence saturable magnetic core **10*a* having wound thereon demagnetizing or reset winding 11*a* and magnetizing winding 12*a*. Connected in series with winding 11*a* are demagnetizing voltage $E_z$ and rectifier 13*a* and connected in series with magnetizing winding 12*a* are magnetizing source $E_{ac}$ and rectifier 14, the alternating voltage sources and the rectifiers being poled whereby in one half-cycle demagnetizing voltage is applied to winding 11*a* through rectifier 13 and in the next half-cycle magnetizing voltage is applied to winding 12*a* through rectifier 14*a*** to provide the alternate operation of the amplifier as described above.

The stages A through N are cascaded with the control impedance for one stage being the output impedance of the preceding stage. Impedance **15*b*, for example, is both the input impedance of stage B and the output impedance of stage A, and therefore couples the magnetizing circuit of stage A in parallel with the demagnetizing circuit of stage B. As thus connected, this impedance constitutes the interstage coupling element necessary for connecting adjacent stages and may take many forms, including simply a resistance, but preferably is of the form to be described in connection with Figure 5. To provide a convenient method for fixing a common reference for the stages, each of impedances 15*a* through 15*d*, and 16*n*** are grounded at the supply voltage end thereof, as shown.

Stage A, being the initial stage, is provided with input terminals 20 to which the pulse to be delayed is applied through isolating rectifier 21. Similar to control voltage $E_c$ described above, the input pulse fed to stage A and developed across input impedance **15*a*, is of the polarity necessary to oppose the application of demagnetizing voltage to winding 11*a*. In a like manner, therefore, a pulse applied to input impedance 15*a* in the demagnetizing half-cycle of core 10*a* determines the degree of resetting of the core since the voltage across 15*a* subtracts from the value of demagnetizing voltage applicable to winding 11*a***.

In order for the pulse applied at terminals 20 to progress along the chain of delay stages it is necessary that the magnetizing circuit of one stage be active or inactive, as the case may be, during the same half-cycle that the demagnetizing circuit of the next succeeding stage is respectively active or inactive. For example, during the half-cycle in which the demagnetizing circuit of stage A is active, the various polarities of the demagnetizing and magnetizing voltages should be as illustrated in Figure 3. Imposition of the foregoing condition for the combination of stages in view of the alternate operation of individual stages, determines that while demagnetizing voltage is being applied to winding 11*a*, magnetizing voltage for stage A should be blocked by rectifier 14*a* in the same half-cycle. Therefore, the demagnetizing circuit of stage B should also be inactive in this half-cycle, as shown, from which it follows that the magnetizing circuit of stage B is active, and hence the demagnetizing circuit of stage C is also active, etc.

To illustrate the sequence of events which occur as a pulse progresses through the stages, consider that in the beginning of the half-cycle indicated by the various polarities in Figure 3, to be referred to as the first half-cycle, an input pulse equal in magnitude to the demagnetizing voltage of stage A is applied at terminals 20. In this case the magnetization level of core 10a is not reset since the demagnetizing voltage is effectively cancelled. In the next or second half-cycle the polarities indicated in Figure 3 will be reversed whereupon the magnetizing voltage of stage A causes the flow of magnetizing current in the circuit including winding 12*a*, rectifier 14*a* and impedance 15*b*. Core 10*a* is saturated, however, and no reactive voltage appears across winding 12*a*. As a result, the magnetizing voltage of stage A is applied directly across interstage coupling impedance 15*b*, saturation or load current now flowing in the circuit. In the same half-cycle, stage B demagnetizing voltage is ordinarily applied to winding 11*b* through rectifier 13*b* and impedance 15*b*, but inasmuch as the output voltage of stage A is wholly developed across impedance 15*b* and is of opposite polarity, the demagnetizing voltage of stage B is effectively cancelled. This results in core 10*b* remaining at the saturation level. During the second half-cycle of operation the magnetizing circuit of stage B is, of course, inactive.

In the third half-cycle the polarities of the voltages are again as illustrated in Figure 3. As core 10*b* is now saturated, the magnetizing voltage of stage B appears across interstage coupling impedance 15*c* and opposes the application of demagnetizing voltage to winding 11*c* of stage C, whereby core 10*c* remains at the saturation level. In a like manner, in the fourth half-cycle, being a magnetizing half-cycle for stage C, saturation current flows in the magnetizing circuit of stage C, resulting in the output voltage thereof being applied in opposition to the demagnetizing voltage of stage D whereby the magnetization level of core 10*d* remains at the saturation level. Thus the input pulse appearing at terminals 20 and developed across impedance 15*a* in the first half-cycle is seen to appear in successive half-cycles as the output voltage of the respective stages at impedances 15*b*, 15*c*, 15*d*, eventually to appear as the output voltage developed at impedance 16*n* of the last stage in the delay line, from which impedance the delayed pulse may be obtained as by output terminal 22. It is to be noted that the number of half-cycle delays experienced by the input pulse corresponds to the number of stages A through N in the delay line.

Where it is desired that the delay line serve as a timing circuit for sequentially timing a plurality of separate devices in half-cycle steps, output terminals 22*a*, 22*b*, 22*c* and 22*d*, connected respectively to impedances 15*a* through 15*d*, may be provided. With such connections, as the input pulse at terminals 20 progresses along the delay line, the output voltages developed at the interstage coupling impedances may be fed as timing pulses to the devices to be sequentially activated. In this connection it will be observed that the timing pulse intervals depends upon the operating frequency of the line. By appropriate selection of the operating frequency, therefore, any desired timing pulse interval may be obtained. That is, if it is contemplated that a number of devices are to be timed in $\frac{1}{60}$ sec. intervals, the circuit operating frequency will obviously be 60 cycles. Where the timing intervals must either be longer or shorter than $\frac{1}{60}$ sec., the operating frequency will be chosen accordingly, either as a frequency lower or higher than 60 cycles respectively.

Should the timing function to be served require a ring timing circuit, that is, a timing circuit in which the progressively delayed pulse is recycled for repetitive timing cycles, the delay line of Figure 3 may be additionally provided with recycling line 25 and isolating rectifier 26. The delay line is now in the form of a plurality of time delay stages coupled in endless series. As thus connected, an initial pulse applied at terminals 20, after passing through the delay line and appearing across impedance 16*n*, is fed back by virtue of line 25 and rectifier 26 to the input impedance 15*a* of the first stage. Since the recycled pulse is simply a power-amplified form of the primary pulse, it will likewise be propagated down the delay line in the same manner as was the primary pulse. Activation of the delay line, in the endless series form of Figure 3, will result in continuous recycling of the initiating pulse until such time as the feed-back pulse is effectively cancelled with respect to the demagnetizing voltage of stage A. In order to inhibit recycling, impedance 15*a* is preferably of the form to be described in connection with Figure 6 in which provisions are made for the application thereto of a pulse in opposition to the recycled pulse for the cancelling thereof. The introduction of the opposition or inhibit pulse in stage A will permit normal demagnetizing action for inhibiting reactivation of the delay line.

Figure 4:
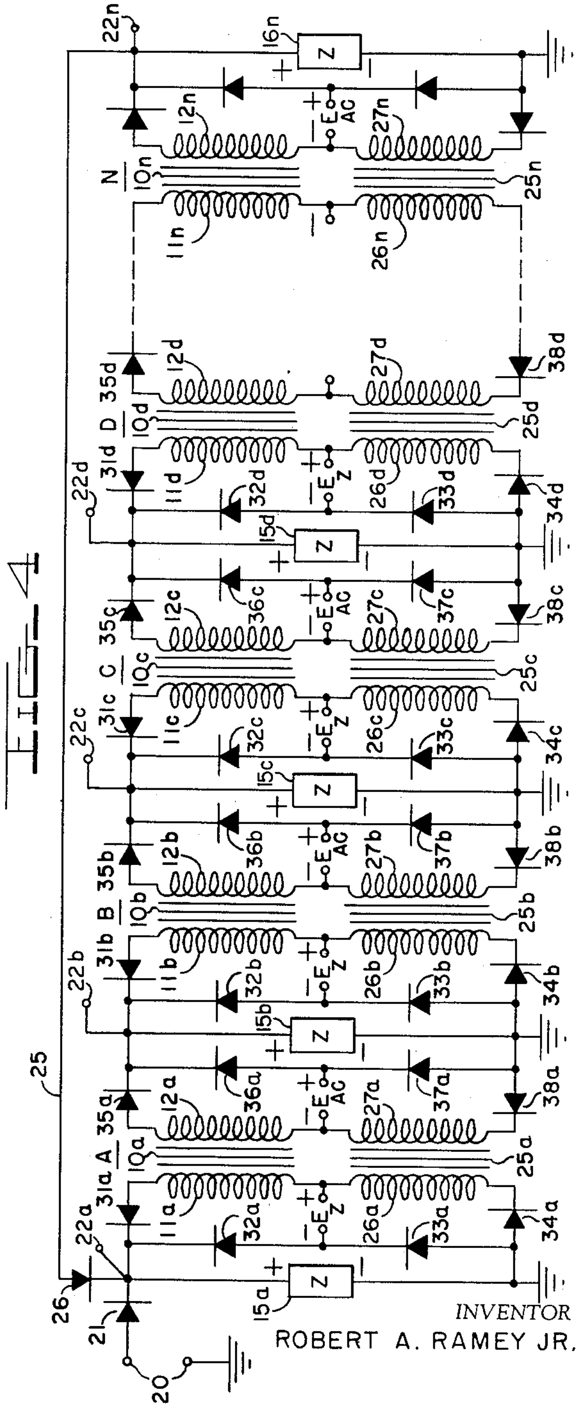
Figure 4 is a schematic diagram of another embodiment of the present invention.

The delay line or timing circuit illustrated in Figure 3 has the disadvantage that the primary driving pulse must be coincident with a demagnetizing half-cycle of stage A. This disadvantage further requires that where the delay line is in the form of a timing circuit, there must be an even number of time delay stages for assuring that the recycled pulse at line 25 occurs in coincidence with the demagnetizing half-cycle of stage A. These limitations are obviated by the appropriate paralleling of two single core amplifiers for each stage, as shown in Figure 4. The provision of an additional core to each of the delay stages assures that application of an input pulse thereto in either odd or even half-cycles of the alternating voltage supply source will prevent the full resetting of one or the other of the cores; and in the next half-cycle of stage operation that core will become saturated as described in connection with Figure 3. Specifically, each stage, for example stage A, includes the usual core 10*a* having windings 11*a* and 12*a* wound thereon, and in addition core 25*a* having windings 26*a* and 27*a* wound thereon. The demagnetizing windings 11*a* and 26*a* are disposed in adjacent legs of a bridge rectifier network comprising rectifiers 31*a*, 32*a*, 33*a* and 34*a*. Demagnetizing source $E_z$ is connected across one side of the rectifier bridge and the input impedance connected across the other side whereby a demagnetizing voltage is applied through the bridge to winding 11*a* and impedance 15*a* in one half-cycle and to winding 26*a* and impedance 15*a* in the other half-cycle. In the magnetizing circuit, magnetizing voltage source $E_{ac}$, magnetizing windings 12*a* and 27*a* and interstage coupling impedance 15*b* are included in a rectifier bridge in a similar manner as the demagnetizing circuit, the magnetizing circuit bridge including rectifiers 35*a*, 36*a*, 37*a* and 38*a*. Further, the magnetizing circuit bridge is arranged so that magnetizing voltage is applied to magnetizing winding 12*a* or 27*a* in the half-cycle in which demagnetizing voltage is being applied to winding 26*a* or 11*a* respectively.

In operation, the parallel amplifiers in each stage of the circuit of Figure 4 are individually responsive in any given half-cycle and thus, are similar in operation to the single amplifier stages in the circuit of Figure 3. Generally, upon a driving pulse being applied to terminals 20 and impedance 15*a*, depending upon which of the cores 10*a* or 25*a* is in the demagnetizing half-cycle, one of the cores in stage A will not be fully reset. Consequently, the magnetizing winding for that core will carry saturation current in the next half-cycle resulting in output voltage being developed across coupling impedance 15*b*, being the input impedance to the next stage B, which causes the pulse to be fed to stage B and thus to be propagated through the delay line. More particularly, in the half-cycle indicated by the polarities shown in Figure 4, arbitrarily designated as an even half-cycle, the input driving pulse appearing across impedance 15*a* blocks the application of demagnetizing voltage $E_z$ to winding 11*a* through the circuit path including winding 11*a*, rectifier 31*a*, impedance 15*a* and rectifier 33*a*. At the same time demagnetizing voltage is blocked from winding 26*a* by rectifier 34*a*, magnetizing voltage is blocked from magnetizing winding 12*a* by rectifier 35*a*, while magnetizing voltage is applied to magnetizing winding 27*a* through the circuit path including rectifier 36*a*, impedance 15*b*, rectifier 38*a* and winding 27*a*. In the following odd half-cycle magnetizing voltage $E_{ac}$ is applied to winding 12*a* through rectifier 35*a*, impedance 15*b* and rectifier 37*a* which effects saturation of core 10*a*, the saturation current thereby caused to flow resulting in output voltage being developed across impedance 15*b*. Also active during the odd half-cycle is the demagnetizing circuit for core 25*b* in stage B, demagnetizing voltage being applied to winding 26*b* in stage B through the circuit path including rectifier 32*b*, impedance 15*b*, rectifier 34*b* and winding 26*b*. It is to be noted that the voltage developed across impedance 15*b*, being the output pulse of stage A, acts in opposition to the application of demagnetizing voltage to winding 26*b* for preventing the reset thereof, whereby the pulse is propagated down the delay line as described above.

Alternatively, should the driving pulse occur during an odd half-cycle, the voltage developed across impedance 15*a* will oppose the application of demagnetizing voltage to winding 26*a* of stage A through the circuit path including the demagnetizing source $E_z$, rectifier 32*a*, impedance 15*a*, rectifier 34*a* and winding 26*a*. It follows from the operation described above that in the next half-cycle, being an even half-cycle, magnetizing voltage is applied through rectifier 36*a*, impedance 15*b*, rectifier 38*a* to winding 27*a* to cause saturation of core 25*a*, the resultant saturation current again developing across impedance 15*b* an output pulse for stage A of the same polarity as before. Regardless of the half-cycle in which the driving pulse occurs, therefore, the pulse is propagated down the delay line. From this fact it follows that regardless of the half-cycle in which the pulse appears across output impedance 16*n* of final stage N, the pulse may be recycled by line 25 and rectifier 26 to the first stage input impedance 15*a* to initiate another cycle of the operation as described. The number of stages in the chain, therefore, need not be an even number.

Figure 5:
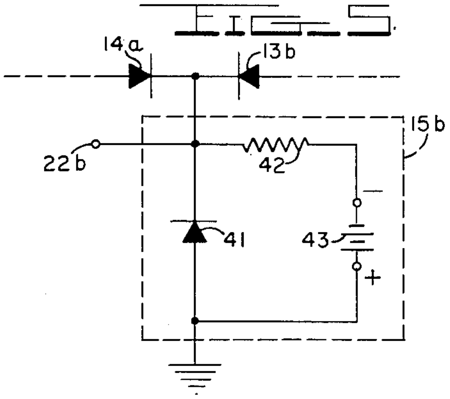
Figure 5 is a schematic diagram of a non-linear coupling impedance employed as the interstage coupling impedance for the magnetic circuits illustrated in Figures 3 and 4.

In order to permit the most efficient demagnetizing action as possible it may be desired that the interstage coupling impedances 15*a*, 15*b*, 15*c*, 15*d* and 16*n* present a low impedance path for demagnetizing currents while yet presenting a high impedance with respect to pulses fed thereto. In Figure 5 there is illustrated a coupling impedance which possesses these qualities. The coupling impedances, for example impedance 15*b*, may include unilateral impedance 41, also shown as a rectifier, poled in opposition to the flow of demagnetizing current through demagnetizing circuit of stage B through rectifier 13*b* and the flow of magnetizing current from stage A through rectifier 14*a*. In parallel with rectifier 41 is a series circuit including a high impedance element 42 and a D. C. voltage source 43 designed to supply to the magnetizing circuit of stage A and the demagnetizing circuit of stage B current of a magnitude slightly greater than the sum of the magnetizing and demagnetizing currents of the stages coupled. Source 43 is, of course, of a polarity in consonance with the polarities of rectifiers 14*a* and 13*b*. In operation the magnitude of current delivered by source 43 permits the core of stage A to be magnetized and the core of stage B to be reset through impedance 15*b* with practically no interaction since the impedance of the circuit is quite low when the current requirements for the coupled stages is less than the current supplied by source 43. Upon saturation of the core in stage A, however, the saturation current flowing through winding 12*a* would tend to exceed the current delivered by source 43, in which case, the impedance of coupling 15*b* immediately approaches the resistance of element 42. Accordingly, the potential drop across element 42 is equivalent to magnetizing voltage $E_{ac}$ which may then act to prevent resetting of the core in stage B. This type of coupling is additionally preferred since the capability of the stages to supply power to the device coupled thereto to be timed, as by output terminal 22*b*, remains practically undiminished.

Figure 6:
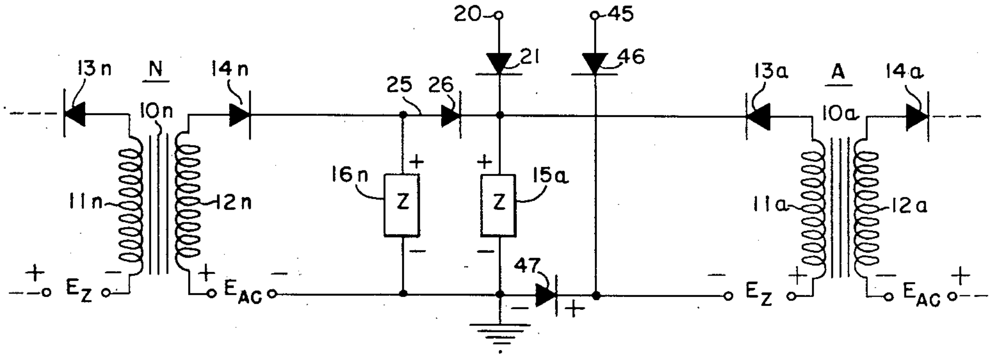
Figure 6 is a schematic diagram of a signal input circuit useful for adapting the magnetic delay line illustrated in Figure 3 as a ring timing circuit.

In connection with the endless timing circuit illustrated in Figure 3, in order to terminate pulse recycling, means must be provided for injecting an inhibiting pulse to the input of the first stage. A circuit for providing this function is illustrated in Figure 6. As shown the last stage N in the delay line is coupled to the input of the first stage A whereby an output pulse appearing across impedance 16*n* of stage N is fed by line 25 and rectifier 26 to input impedance 15*a* of stage A. An additional circuit is coupled to the demagnetizing circuit of stage A for introducing an inhibitor pulse thereto to effect cancellation of the pulse developed across impedance 15*a* from stage N and to permit full resetting of core 10*a* in stage A. This circuit includes input terminal 45, isolating rectifier 46, and rectifier 47. It is contemplated that the inhibitor pulse at terminal 45 will be applied across rectifier 47 in the half-cycle during which an output pulse from stage N is to be expected. Further, the inhibitor pulse, as applied in the demagnetization circuit of stage A, should be at least of a magnitude equal to the amplitude of and opposite in polarity to the pulse supplied by stage N. Rectifier 47 is poled to prevent short-circuiting of the inhibitor pulse source while yet allowing normal demagnetizing current to flow in stage A. In operation of the circuit, assuming that a pulse from stage N appears at impedance 15*a* and an inhibitor pulse is applied across 47 in the polarity indicated, by tracing the demagnetizing circuit path of stage A, being source $E_z$, winding 11*a*, rectifier 3*a*, impedance 15*a* and rectifier 47, the inhibitor pulse is seen to be of opposite polarity to the voltage developed across 15*a*, which voltage is effectively cancelled. Demagnetizing source $E_z$ may now completely reset core 10*a* as described hereinbefore.

Use of the coupling circuit illustrated in Figure 6, including both input terminal 20 and inhibitor pulse input circuit, for each of the interstage coupling impedances 15*a*, 15*b*, 15*c* and 15*d* in the ring timing circuit of Figure 3 would permit simultaneous pulsing of all the stages. This form of the circuit would find particular utility in telemetering devices wherein instantaneous information may arrive in digital form but must be converted to sequential pulses for interpretation. The instantaneous information, fed in parallel to the stages, may be obtained as sequential pulses from one of the output terminals of the ring timing circuit as at impedance 16*n* and terminal 22*n*.

Generally the foregoing description relates to delay lines utilizing magnetic components. Contrary to prior magnetic devices there is in the circuitry of the present invention no exponential-like rises of output, but rather, full output is obtained immediately following the half-cycle time delays as described. In addition the magnetic circuitry described remains essentially an amplifier and hence, the pulse power needed for activating each stage remains a very small fraction of the pulse power available from the stage.

Although the specific embodiments shown and described herein are preferred many modifications and variations may be made by those skilled in the art without departing from the spirit of the present invention which is not to be limited except insofar as necessary by the scope of the disclosure.

The invention described herein may be manufactured and used by or for the Government of the United States of America for governmental purposes without the payment of any royalties thereon or therefor.

What is claimed is:

1. A magnetic delay network comprising a plurality of time delay stages coupled in cascade; each stage including at least one saturable magnetic core, magnetizing and demagnetizing control means alternately operative to magnetize and demagnetize the associated core; and interstage coupling means operative upon saturation of the saturable core in any one of said stages to reduce the effectiveness of the demagnetizing means in the next succeeding stage.

2. A magnetic delay network comprising a plurality of time delay stages coupled in cascade; each stage including at least one saturable magnetic core, magnetizing and demagnetizing control means alternately operative to magnetize and demagnetize the associated core; the cores in adjacent stages being respectively magnetized and demagnetized synchronously; and interstage coupling means operative upon saturation of the saturable core in any one of said stages to reduce the effectiveness of the demagnetizing means in the next succeeding stage.

3. A magnetic delay network comprising an alternating voltage supply means; a plurality of time delay stages coupled in cascade; each of said stages including at least one saturable magnetic core, a magnetizing and demagnetizing control circuit means coupled to and respectively operative in successive half-cycles of said voltage supply means to magnetize and demagnetize said core; and interstage coupling means operative upon saturation of the saturable core in any one of said stages to reduce the effectiveness of the demagnetizing means in the next succeeding stage.

4. A magnetic time delay network comprising a plurality of time delay stages coupled in series; each of said stages including at least a saturable magnetic core having an input and an output winding wound thereon, magnetizing and demagnetizing control circuit means including alternating voltage supply means for applying magnetizing and demagnetizing voltage to said output and input windings respectively, unilateral impedance means in said circuits for rendering said magnetizing and demagnetizing means alternately operative on said core; the cores in adjacent stages being respectively magnetized and demagnetized in the same period of time; and interstage coupling means operative upon saturation of the core in one of said stages to apply the magnetizing voltage thereof in opposition to the demagnetizing voltage in the control circuit of the next succeeding stage.

5. A magnetic time delay network substantially as set forth in claim 4 wherein said interstage coupling means comprises an impedance connecting in parallel the magnetizing control circuit of each of said stages with the demagnetizing control circuit of the next succeeding stage.

6. A magnetic time delay network comprising a plurality of time delay stages coupled in series; each stage including at least one saturable magnetic core, respective magnetizing and demagnetizing control circuit means including alternating voltage supply means successively operative to magnetize serially and to demagnetize serially said cores in successive half-cycles of said supply means, pulse input means in each of said stages responsive to an input pulse for reducing the effectiveness of the demagnetizing means therein thereby to cause said magnetizing means to saturate the corresponding core and to generate an output pulse, and interstage coupling means for delivering the output pulse of one stage to the input means of the next succeeding stage.

7. A magnetic time delay network comprising a plurality of time delay stages in series; each of said stages including a high remanence saturable magnetic core, magnetizing and demagnetizing control circuit means for alternately shifting the core magnetization level to the saturation level and to a given level below saturation respectively, pulse input means responsive to a pulse fed thereto to prevent said demagnetizing means to shift the magnetization level to said given level resulting in said magnetizing means saturating said core and generating an output pulse; the cores in adjacent stages being respectively magnetized and demagnetized synchronously; and coupling means for delivering the output pulse of each of said stages to the input means of the next succeeding stage.

8. A magnetic delay network comprising a plurality of saturable core reactor stages coupled in series; a control circuit including an alternating voltage supply means for each of said stages operative to saturate serially said reactors in successive half-cycles of said supply means, pulse input means in the first of said stages responsive to the application of an input pulse to cause saturation current to flow in the saturating half-cycle of said first stage in accordance with said pulse, and interstage coupling means responsive to flow of saturation current in any one of said stages to cause saturation current to flow in the next succeeding stage in the saturating half-cycle thereof.

9. A magnetic timing circuit comprising a plurality of time delay stages coupled in series; each stage including at least a saturable magnetic core, magnetizing and demagnetizing control circuit means alternately operative to magnetize and demagnetize said core; interstage coupling means operative upon the flow of saturation current in the magnetizing control circuit in any one of said stages to reduce the effectiveness of the demagnetizing means in the next succeeding stage; and means for deriving an output timing pulse from each of said stages upon saturation current flow therein.

10. A magnetic timing circuit comprising a plurality of time delay stages coupled in series; each stage including at least a saturable magnetic core, magnetizing and demagnetizing control circuit means alternately operative to magnetize and demagnetize said core; driving pulse input means in the first of said stages responsive to a driving pulse to cause the flow of saturation current in the magnetizing control circuit means of said first stage; interstage coupling means responsive to saturation current flow in any one of said stages to reduce the effectiveness of the demagnetizing means in the next succeeding stage thereby to cause saturation current to flow in said next stage; and means for deriving an output timing pulse from each of said stages in response to saturation current flow therein.

11. A magnetic timing circuit comprising an alternating voltage supply means; a plurality of magnetic amplifier stages coupled in series, each of said stages including at least one saturable magnetic core, magnetizing and demagnetizing control circuit means coupled to and respectively operative in successive half-cycles of said supply means to magnetize and demagnetize said core; interstage coupling means operative upon saturation of the saturable core in any one of said stages to reduce the effectiveness of the demagnetizing means in the next succeeding stage; means for deriving an output pulse from each of said stages in response to saturation of the respective cores therein; and means in the first of said stages responsive to the application of an initiating pulse thereto to reduce the effectiveness of the demagnetizing means in said first stage.

12. A magnetic timing circuit comprising an alternating voltage supply means; a plurality of magnetic amplifier stages coupled in series, each of said stages including at least a saturable magnetic core having a magnetizing and a demagnetizing winding wound thereon, unilateral impedance means coupling said magnetizing and demagnetizing windings to said alternating supply means for causing said supply means to apply successive half-cycles of voltage to said magnetizing and demagnetizing windings respectively thereby to magnetize and demagnetize alternately said core; the unilateral impedance means in adjacent stages being arranged to cause the magnetization and demagnetization of the respective cores therein in a given half-cycle; means for applying an initiating pulse in opposition to the demagnetizing half-cycle voltage in the first of said stages, the magnetizing half-cycle of voltage thereby saturating said first core and supplying an output pulse through said magnetizing winding; interstage coupling means for applying the output pulse of any stage in opposition to the demagnetizing voltage in the next succeeding stage; and output pulse terminal means connected to each of said coupling means respectively.

13. A magnetic timing circuit substantially as set forth in claim 12 wherein said interstage coupling means comprises an impedance in parallel with and coupling in parallel the magnetizing winding of each stage with the demagnetizing winding of the next succeeding stage.

14. A magnetic ring timing circuit comprising a plurality of time delay stages coupled in endless series; each stage including at least a saturable magnetic core, magnetizing and demagnetizing control circuit means alternately operative to magnetize and demagnetize said core; the cores in adjacent stages being magnetized and demagnetized in the same period of time; means for injecting an initiating pulse in one of said stages for causing saturation of the core therein resulting in the flow of saturation current in the magnetizing control circuit means; interstage coupling means responsive to the flow of saturation current in any stage to reduce the effectiveness of the demagnetizing means in the next succeeding stage thereby to cause said next stage magnetizing means to saturate the corresponding core; and means for deriving an output timing pulse from each of said stages upon saturation current flow therein.

15. A magnetic ring timing circuit comprising a plurality of time delay stages coupled in endless series; each stage including at least a saturable magnetic core having a magnetizing and demagnetizing winding wound thereon, means including alternating supply voltage means for alternately applying magnetizing and demagnetizing voltage to said magnetizing and demagnetizing windings respectively in successive half-cycles; magnetizing voltage being applied to the magnetizing winding in a given stage and demagnetizing voltage being applied to the demagnetizing winding in the next succeeding stage in the same half-cycle; means for applying an initiating pulse in opposition to the demagnetizing voltage in one of said stages whereby in the next half-cycle the magnetizing voltage in said one stage causes saturation of the core therein resulting in the flow of saturation current through the magnetizing winding thereof; interstage coupling means responsive to the flow of saturation current in any stage to produce a voltage in opposition to the demagnetizing voltage in the next succeeding stage thereby to cause said next stage magnetizing voltage to saturate the associated core; and means for deriving an output timing pulse from each of said stages in accordance with saturation current flow therein.

References Cited in the file of this patent

UNITED STATES PATENTS

| | | |
|---|---|---|
| 2,552,952 | Gachet et al. | May 15, 1951 |
| 2,578,405 | Downie | Dec. 11, 1951 |
| 2,650,350 | Heath | Aug. 25, 1953 |

OTHER REFERENCES

Ramey: "On the Mechanics of Magnetic Amplifier Operation," AIEE Technical Paper 51–217, published by the American Institute of Electrical Engineers, New York, on May 2, 1951. (Copy in 179–171 MA.)